United States Patent
Haralson et al.

(10) Patent No.: US 12,073,856 B1
(45) Date of Patent: Aug. 27, 2024

(54) DATA STORAGE DEVICE WITH LASER PRE-BIAS OPTIMIZATION USING DISK THERMAL-MAGNETIC RESPONSE MAPPING IN HEAT-ASSISTED MAGNETIC RECORDING

(71) Applicant: WESTERN DIGITAL TECHNOLOGIES, INC., San Jose, CA (US)

(72) Inventors: Phillip S. Haralson, Huntington Beach, CA (US); Farzad Novin, Laguna Niguel, CA (US); Pierre-Olivier Jubert, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/232,009

(22) Filed: Aug. 9, 2023

Related U.S. Application Data

(60) Provisional application No. 63/455,879, filed on Mar. 30, 2023.

(51) Int. Cl.
  *G11B 27/36* (2006.01)
  *G11B 5/012* (2006.01)
  (Continued)

(52) U.S. Cl.
  CPC ........... *G11B 5/03* (2013.01); *G11B 5/012* (2013.01); *G11B 2005/0021* (2013.01)

(58) Field of Classification Search
  CPC ... G11B 7/1263; G11B 5/455; G11B 7/00456; G11B 7/1267; G11B 7/00458;
  (Continued)

(56) References Cited

U.S. PATENT DOCUMENTS 6,751,039 B1 * 6/2004 Cheng ................. G11B 5/00
8,929,186 B1 1/2015 Sharma et al.
(Continued)

FOREIGN PATENT DOCUMENTS

WO 2016187379 A1 11/2016

OTHER PUBLICATIONS

S. Xiong et al., "Spacing Control in Heat Assisted Magnetic Recording", in IEEE Magnetics TMRC 2018, Aug. 2018, 6 pages. http://tmrc2018.ucsd.edu/Archive/Digest.pdf.

*Primary Examiner* — Nabil Z Hindi
(74) *Attorney, Agent, or Firm* — Calderon Safran & Wright, PC

(57) ABSTRACT

Various illustrative aspects are directed to a data storage device, comprising one or more disks; an actuator mechanism configured to position one or more heads proximate to a corresponding disk surface of the one or more disks; and one or more processing devices. The one or more processing devices are configured to generate a determination of magnetic responsiveness to thermal energy of at least one position of the corresponding disk surface in response to an operation of the selected head. The one or more processing devices are further configured to determine and apply a pre-bias current to the thermally energizing component prior to a write operation, with the selected head proximate to the at least one position of the corresponding disk surface, wherein the pre-bias current is based on the determination of magnetic responsiveness to thermal energy of the at least one position of the corresponding disk surface.

14 Claims, 7 Drawing Sheets

(51) Int. Cl.
*G11B 5/03* (2006.01)
*G11B 11/105* (2006.01)
*G11B 5/00* (2006.01)

(58) Field of Classification Search
CPC ............ G11B 13/08; G11B 2005/0021; G11B 11/1051; G11B 11/105; G11B 5/00; G11B 5/6088; G11B 11/10511; G11B 11/80; G11B 11/10534; G11B 5/012; G11B 5/02; G11B 5/54; G11B 5/40; G11B 5/4555; G11B 5/4866; G11B 20/18; G11B 7/125
USPC .......................................................... 360/59
See application file for complete search history.

(56) References Cited

U.S. PATENT DOCUMENTS

| | | |
|---|---|---|
| 9,240,205 B1 | 1/2016 | Gao et al. |
| 9,595,288 B1 | 3/2017 | Chu et al. |
| 9,620,162 B1 | 4/2017 | Haralson |
| 10,381,036 B1 | 8/2019 | Lammers et al. |
| 10,446,182 B1 | 10/2019 | Zhang et al. |
| 10,643,651 B1 * | 5/2020 | Rea .......................... G11B 5/02 |
| 2016/0055881 A1 | 2/2016 | Cordle et al. |
| 2022/0343943 A1 | 10/2022 | Poss et al. |

* cited by examiner

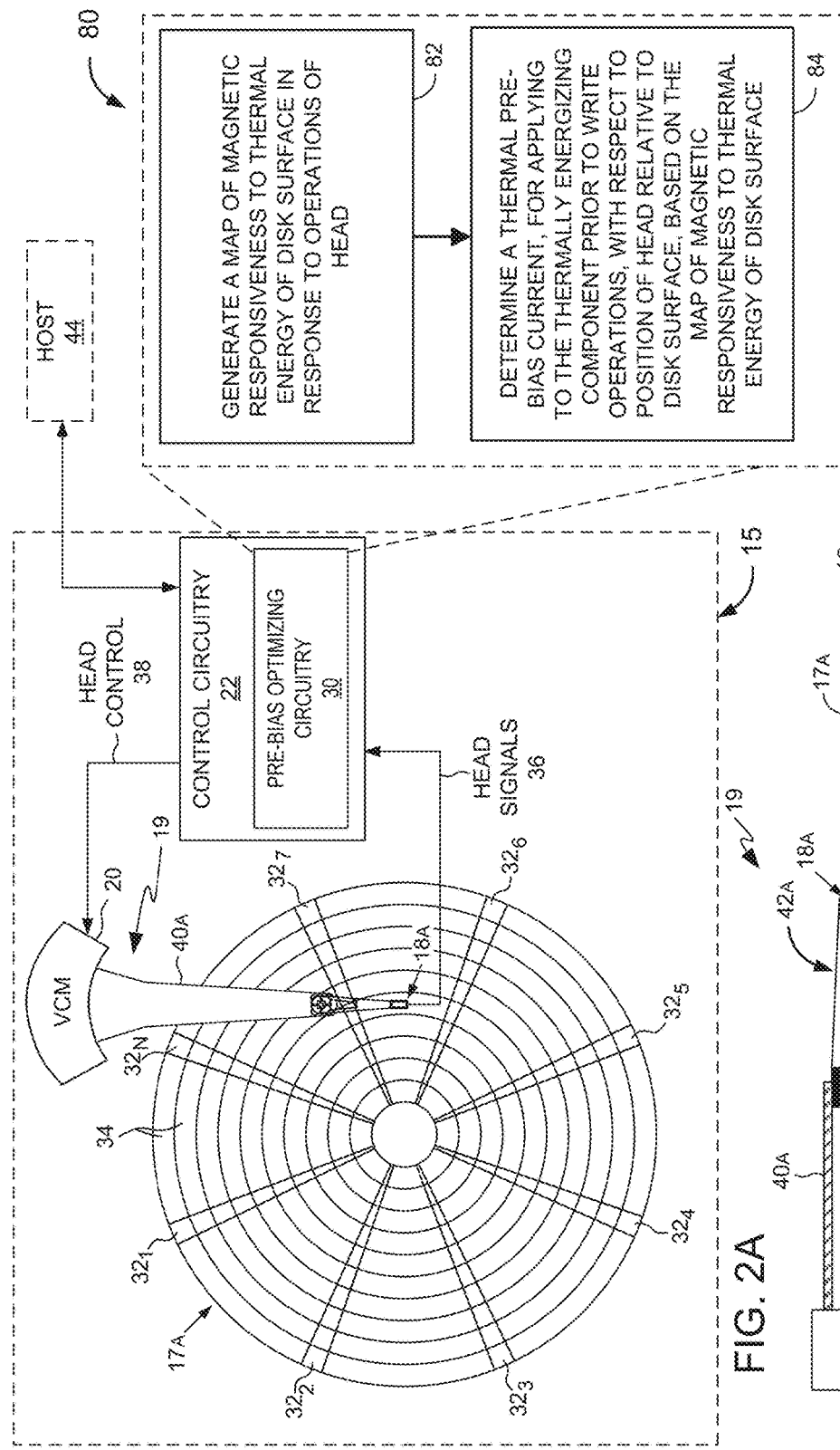
FIG. 2A
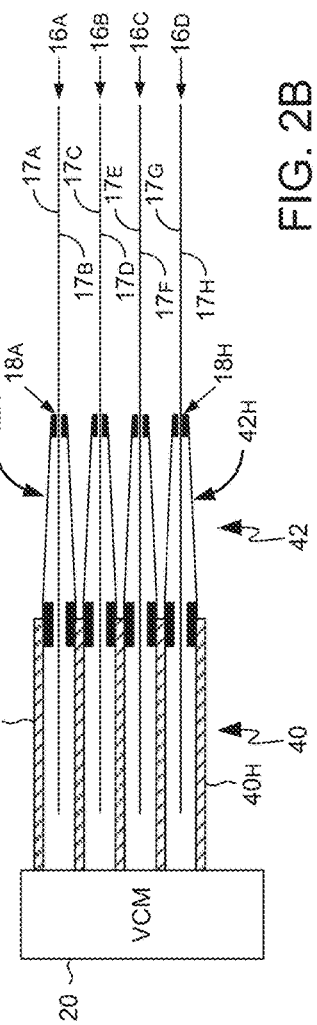
FIG. 2B
FIG. 2C

DATA STORAGE DEVICE WITH LASER PRE-BIAS OPTIMIZATION USING DISK THERMAL-MAGNETIC RESPONSE MAPPING IN HEAT-ASSISTED MAGNETIC RECORDING

BACKGROUND

Data storage devices such as disk drives comprise a disk and a read/write head ("head") connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors on the disk surfaces via the read/write heads. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide novel and inventive circuitry, systems, devices, methods, and techniques for intelligently tuning and optimizing laser pre-bias of each individual head in a heat-assisted magnetic recording (HAMR) disk drive, based on mapping the individual properties of the individual heads and their individual corresponding disk surfaces. Control circuitry of this disclosure may test and determine magnetic grain responsiveness to temperature at any one or more positions of a disk surface, and set an optimized laser pre-bias current based on the determined magnetic grain responsiveness to temperature at the locations of the disk surface. Tuning and optimizing laser pre-bias based on the properties of the heads and their corresponding disk surfaces enables various enhanced data storage performance properties, such as superior throughput, fewer latency events, and more reliable data write operations in a HAMR disk drive, in ways beyond what is possible in a conventional HAMR disk drive. Inventive insights of this disclosure into the challenges and shortcomings of conventional HAMR disk drives, and novel ways and methods of this disclosure to surmount and transcend those shortcomings, are disclosed as follows.

HAMR disk drives enable higher data densities than conventional perpendicular magnetic recording (PMR) heads. In HAMR disk drives, a laser diode comprised in each head heats the corresponding disk surface during write operations to decrease the magnetic coercivity of a high-coercivity magnetic medium of the disk surface, such as iron-platinum nanoparticles that form high-anisotropy, single-domain superparamagnetic grains. The laser heating the high-coercivity medium thereby enables a magnetic field generated by a write coil of the head to magnetize the temporarily heated area of disk surface. Inventive aspects of this disclosure include novel insights into various challenges and shortcomings of conventional HAMR disk drives, and novel ways to address and resolve those challenges and shortcomings.

In conventional HAMR disk drives, operating the lasers in the heads involves complex effects on write performance. Heating of the head by the laser induces complex effects on the fly height or head-disk spacing between the write element pole tip of the head and the disk surface. Thermal energy from the laser induces protrusion and modification of the head and evolving changes in the fly height over the course of a write operation, particularly during the initial interval of a write operation. The laser may also exhibit complex responses to applied current, such as laser mode hops, in which the laser power output suddenly changes non-linearly with respect to applied current, due to the laser diode suddenly shifting from one laser emission mode to another. The laser diode may also heat itself over time, which may result in complex effects such as decay of laser power, increased laser mode hop frequency, and increased write transients due to increased cooling over the servo wedges. All of these effects have typically interfered with or prevented nominal write strength and reliable writes in conventional HAMR drives, particularly during the initial stage of an attempted write operation.

Recent advances in HAMR technologies have included applying an early partial laser pre-bias current to a laser diode incorporated in a HAMR read/write head, at a set value of pre-bias current, prior to activating the laser at nominal current for write operations. By applying a laser pre-bias current prior to beginning a write operation, there is less of a shift in thermal energy of both the laser diode and the head, less change in thermal pole tip protrusion of the head, and reduced likelihood of laser mode hop, in going from the laser pre-bias current to the full nominal laser bias current when beginning each write operation. The pre-set value of laser pre-bias current in conventional HAMR disk drives has been motivated by the perceived need to limit laser pre-bias current to keep the laser from heating the disk surface too much and avoid eroding or erasing data or servo patterns.

Tuning and optimizing laser pre-bias current based on mapping the properties of the heads and their corresponding disk surfaces, in accordance with methods and systems of this disclosure, may enable performance properties superior to those of conventional HAMR disk drives, including by addressing or resolving challenges and shortcomings of conventional HAMR disk drives such as those described above. Instead of setting all lasers to a pre-selected value of laser pre-bias, disk drive control circuitry of this disclosure may tune the laser pre-bias current of each head to a value that is optimized among various criteria and based on individual properties for that head, and as mapped out over that head's corresponding disk surface. The tuned value of laser pre-bias as in this disclosure may be higher, and closer to nominal laser write current, than the conventional, pre-set value of laser pre-bias as in conventional HAMR disk drives. The map of thermal responsiveness may record thermal responsiveness of any one or more positions of the disk surface.

Among the inventive insights of this disclosure, different heads have different individual performance properties, and exhibit different performance properties at various locations around their corresponding disk surfaces, and may further exhibit evolving performance properties over time over the entire course of their operational lifetimes. Among the inventive insights of this disclosure, the varying head-disk performance properties include a range of performance properties that affect whether or not the head would erode or erase data at a given laser pre-bias current, while the conventional blanket pre-set level to which laser pre-bias current is limited is driven by outliers, by heads and disk positions of those heads that erode or erase data at the lowest levels of laser pre-bias current. In other words, the conventional set level of laser pre-bias current was seen as needing to be lower than the lowest level at which any head erodes or erases any part of its corresponding disk surface over its operational lifetime, even though the laser pre-bias current at which erosion and erasure of data occurs is not the same from one head to another, or even from one disk surface portion to another for the same head.

In various aspects of this disclosure, by instead characterizing each head's performance properties individually, and individually mapping how the performance of each head's properties varies over its corresponding disk surface, as well as over its operational lifetime, control circuitry of this disclosure may tune and optimize the laser pre-bias current for each head. Control circuitry of this disclosure may further tune and optimize the laser pre-bias current for each head over the course of its motion relative to its corresponding disk surface and over its operational lifetime, based on mapping of the head's local performance properties throughout the disk surface and over time, in various examples. Control circuitry of this disclosure may operate an individual head's laser at a pre-bias current that is as high as possible and as close as possible to the nominal write current, while also being low enough to avoid erasing or eroding data and servo patterns on the head's corresponding disk surface, in the context of the individual head, disk surface position, and duration over time, in various examples. Control circuitry of this disclosure may further vary an individual head's laser at varying levels of pre-bias current at different portions of the disk surface and at different times, to apply the closest pre-bias current to nominal write current that avoids erasure or erosion of data and servo patterns as that value varies across the different portions of the disk surface and over time, in various examples. By tuning and optimizing the laser pre-bias current for each head across its disk surface and over time based on the detected individual performance properties of each head across an individual mapping of variation of properties across the disk surface and over time, a disk drive of this disclosure may optimally reduce deleterious effects on write performance such as laser power decay, laser mode hop, write transients, and other root causes of off-nominal write performance, due to variations in temperature of the laser diode or the head and thermally induced variations in shape of the head, in various examples.

A disk drive of this disclosure may characterize the variable write performance in terms of a thermal slope with respect to noise power per head with respect to operating temperature, disk surface position, and time, in various examples. A disk drive of this disclosure may characterize the variable write performance in terms of a thermal slope with respect to noise power in general across all heads, operating temperatures, disk surface positions, and times over operating lifetime, in various examples. A disk drive of this disclosure may characterize the variable write performance in terms of a thermal slope with respect to noise power per head, with respect to operating temperatures, disk surface positions, and times over operating lifetime in terms of fine-tuning adjustments to the generalized thermal slope, in various examples.

A disk drive of this disclosure may also adjust the optimization criteria for the laser pre-bias current, and may provide user or host options for how to adjust the optimization criteria for the laser pre-bias current. The optimization criteria for the laser pre-bias current may be adjusted to use or book higher performance to prioritize one or more performance characteristics relative to others, such as write speed, reduction of outlier latency events, write reliability, and/or for higher data track density, as examples, depending on the preferred performance criteria of a given host data storage operating program.

Various illustrative aspects are directed to a data storage device, comprising one or more disks; an actuator mechanism configured to position one or more heads proximate to a corresponding disk surface of the one or more disks; and one or more processing devices. The one or more processing devices are configured to generate a determination of magnetic responsiveness to thermal energy of at least one position of the corresponding disk surface in response to an operation of the selected head. The one or more processing devices are further configured to determine and apply a pre-bias current to the thermally energizing component prior to a write operation, with the selected head proximate to the at least one position of the corresponding disk surface, wherein the pre-bias current is based on the determination of magnetic responsiveness to thermal energy of the at least one position of the corresponding disk surface.

Various illustrative aspects are directed to a method comprising generating, by one or more processors, a map of magnetic responsiveness to thermal energy of a corresponding disk surface in response to operations of a selected head of a disk drive comprising one or more disks, and an actuator mechanism configured to position a selected head among one or more heads proximate to a corresponding disk surface among the one or more disks, wherein the selected head comprises a thermally energizing component. The method further comprises determining, by the one or more processors, a thermal pre-bias current, for applying to the thermally energizing component prior to write operations, with respect to position of the selected head relative to the corresponding disk surface, based on the map of magnetic responsiveness to thermal energy of the corresponding disk surface.

Various illustrative aspects are directed to one or more processing devices comprising means for generating a determination of magnetic responsiveness to thermal energy of at least one position of the corresponding disk surface in response to an operation of the selected head. The one or more processing devices further comprise means for determining and applying a pre-bias current to the thermally energizing component prior to a write operation, with the selected head proximate to the at least one position of the corresponding disk surface, wherein the pre-bias current is based on the determination of magnetic responsiveness to thermal energy of the at least one position of the corresponding disk surface.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, including for generating a map of magnetic responsiveness to thermal energy of the corresponding disk surface in response to operations of the selected head, and determining a thermal pre-bias current, for applying to the thermally energizing component prior to write operations, with respect to position of the selected head relative to the corresponding disk surface, based on the map of magnetic responsiveness to thermal energy of the corresponding disk surface, in accordance with aspects of the present disclosure.

DETAILED DESCRIPTION

Figure 1:
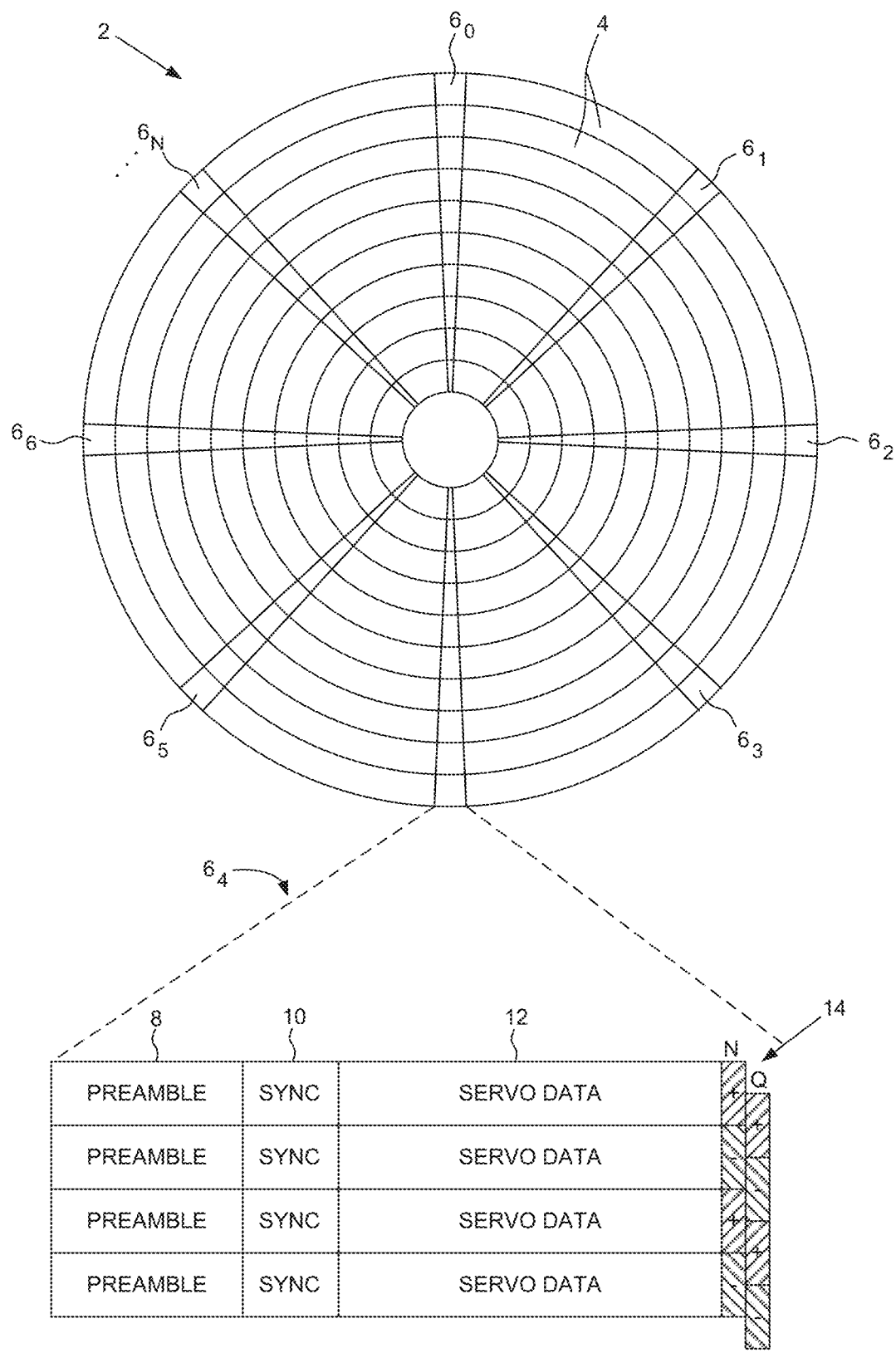
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises laser pre-bias current optimizing circuitry 30 ("pre-bias optimizing circuitry 30"). FIG. 2C depicts a flowchart for an example method 80 that pre-bias optimizing circuitry 30 of control circuitry 22 may perform or execute in controlling the operations of disk drive 15, in accordance with aspects of the present disclosure. These include operations involved in generating a map of thermal and magnetic properties, including magnetic responsiveness to thermal energy, of the corresponding disk surfaces 17 in response to thermally energizing operations of the read/write heads 18 ("heads 18"). These further include operations involved in tuning a thermal pre-bias current, for applying to the thermally energizing component (e.g., laser diode) prior to write operations, with respect to position of each head 18 relative to its corresponding disk surface 17, based on the individual map of thermal and magnetic properties of that corresponding disk surface 17 in its behavior in response to the operations of that head 18. Pre-bias optimizing circuitry 30 may generate the map in terms of both the write current and the thermal energy (e.g., via laser, in some examples) that each head 18 applies to its corresponding disk surface 17, in accordance with aspects of the present disclosure. Pre-bias optimizing circuitry 30 is thus configured to detect and map individual performance properties of heads 18 relative to corresponding disk surfaces 17 of hard disks 16, and to tune and map optimal laser pre-bias current for each head 18 with respect to the portions of its corresponding disk surface 17, in accordance with aspects of the present disclosure.

Pre-bias optimizing circuitry 30 may thus push the energy and morphology of head 18 during pre-bias to relatively closer to the conditions during write operations, compared with conventional HAMR heads. Pre-bias optimizing circuitry 30 may thereby optimize for avoidance of negative effects of the onset of write operations, such as laser mode hops, changes in fly height, and write transients, and optimize for stable and reliable write operations, while also optimally restraining and avoiding thermal decay or erosion of data on disk surfaces 17 induced by the thermal energy of the pre-bias. Pre-bias optimizing circuitry 30 may thereby optimize thermal pre-bias to enhance or optimize reliable starts to heat-assisted magnetic recording (HAMR) write operations while avoiding laser pre-bias-induced thermal erosion of data and servo patterns, to ensure reliable long-term data storage performance, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of heads 18 mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of hard disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces.

The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges 321-32N, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges 321-32N and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more hard disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, pre-bias optimizing circuitry 30 of control circuitry 22 may generate a map of magnetic responsiveness to thermal energy of the corresponding disk surface in response to operations of the selected head (82). Pre-bias optimizing circuitry 30 may further determine a thermal pre-bias current, for applying to the thermally energizing component prior to write operations, with respect to position of the selected head relative to the corresponding disk surface, based on the map of magnetic responsiveness to thermal energy of the corresponding disk surface (84). Control circuitry 22, including laser pre-bias optimizing circuitry 30, may further perform additional actions, methods, and techniques, in accordance with various aspects including as further described herein.

Circuitry 30 may generate a map of magnetic responsiveness to pre-bias thermal energy of the corresponding disk surface in response to operations of the selected head. In an illustrative example, generating the map of thermal and magnetic properties/magnetic responsiveness to pre-bias thermal energy of the corresponding disk surface may comprise holding the write current at zero or a minimal value while operating the head over the disk surface and while applying a sweeping range of different values of laser current.

The term "pre-bias optimizing circuitry 30" as used herein may refer to any hardware, firmware, software, and/or combination thereof, comprised in control circuitry 22 of disk drive 15, which implements, embodies, or engages in any of the structures or functions ascribed herein to pre-bias optimizing circuitry 30 or to any other of the novel and inventive aspects of the present disclosure. Pre-bias optimizing circuitry 30 may constitute any hardware, firmware, software, and/or any other elements of control circuitry 22 for mapping the properties of the disk surfaces in response to the operations of the heads, controlling, tuning, or optimizing laser pre-bias, performing compensatory refresh writes as part of alleviating thermal data erosion due to laser pre-bias, and performing other techniques and methods as described herein. For thermal compensation refresh writing, pre-bias optimizing circuitry 30 may keep track of on-track and adjacent track thermal erosion induced by the thermal pre-bias current; and perform refresh writes to compensate for the on-track and adjacent track thermal erosion induced by the thermal pre-bias current.

Figure 3:
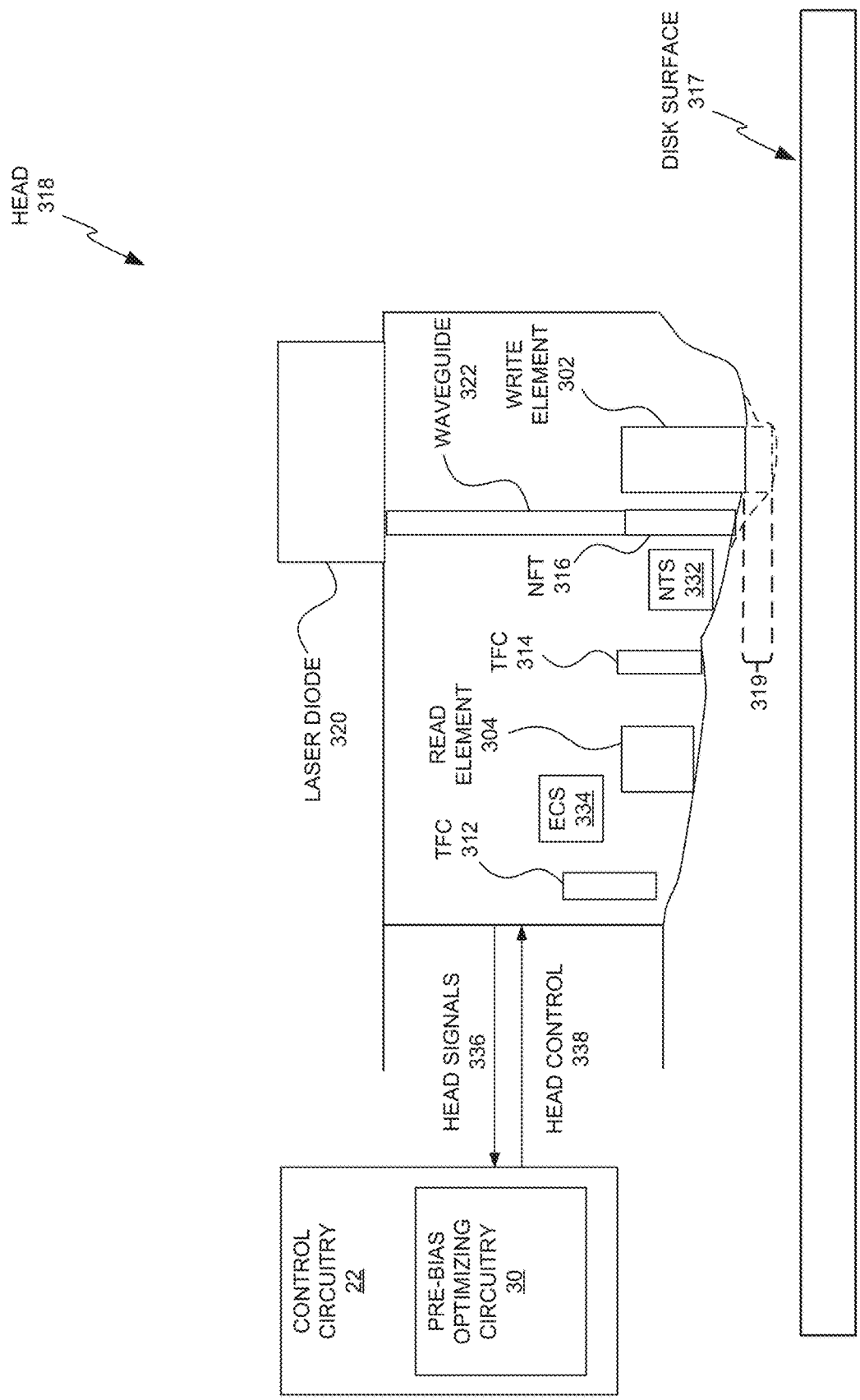
FIG. 3 depicts a conceptual side view diagram of a head of a disk drive, suspended above and operating proximate to a corresponding disk surface, in accordance with various aspects of this disclosure.

FIG. 3 depicts a conceptual side view diagram of a head 318 of a disk drive, suspended above and operating proximate to a corresponding disk surface 317, in accordance with various aspects of this disclosure. Disk surface 317 and head 318 may be respective implementations of any of disk surfaces 17 and heads 18 as depicted in FIGS. 2A and 2B. FIG. 3 depicts changes 319 in protrusion and aerodynamic profile causing changes in fly height 315, or head-disk spacing, due to effects such as near-field transducer (NFT) pole tip protrusion (NPTP) due to laser pre-bias and/or full nominal laser write bias, in accordance with various aspects of this disclosure. FIG. 3 is a conceptual diagram and not an engineering schematic, and the elements depicted may be disposed in any of a variety of arrangements in different examples.

Pre-bias optimizing circuitry 30 may perform a mapping and generate a map of disk surface 317 in terms of its behavior in response to the pre-bias and thermally-assisted write operations of head 318, including head 318 applying both a write current to magnetic write coil of write element 302 and a thermal assistance current (e.g., a laser current) to a thermally energizing component (e.g., laser diode 320 in the example depicted in FIG. 3, or any other kind of thermally energizing component, in other implementations of this disclosure). Pre-bias optimizing circuitry 30 may record the map to take any of various forms in which data may be recorded and then retrieved. Pre-bias optimizing circuitry 30 may record the map as one or more lookup tables, data stores, or any other data structures in which pre-bias optimizing circuitry 30 can retrieve location-based thermal responsiveness data. The example of FIG. 3 is further described as follows with respect to the example depicted in FIG. 3 in which the disk drive is a HAMR drive and the thermally energizing component is implemented as laser diode 320.

Pre-bias optimizing circuitry 30 may perform rapid measurements of the HAMR media distributions relevant to recording performance. Pre-bias optimizing circuitry 30 may measure impacts of both thermal energy from laser power and the magnetic field from the write element on the magnetic switching of each of the magnetic grains or magnetic domains in disk surface 317, as further described below.

Control circuitry 22 outputs head control signals 338 to head 318, and receives head signals 336 (including control signals and data) from head 318. Head 318 includes a write element 302, a read element 304, thermal fly height (TFC) control elements 312 and 314, and a laser-generating component such as a laser diode 320 configured for emitting a laser via waveguide 322 and near-field transducer (NFT) 316. The laser induces a plasmon that heats a track on disk surface 317 that passes proximate to write element 302 as head 318 flies over or proximate to disk surface 317.

Control circuitry 22 writes data to disk surface 317 by modulating a write current in an inductive write coil in write element 302, to record magnetic transitions onto corresponding disk surface 317 in a process referred to as saturation recording. During read-back, read element 304 (e.g., a magneto-resistive element) in head 318 senses the magnetic transitions, and a read channel demodulates the resulting read signal. Heat-assisted magnetic recording (HAMR) enables high-quality written data at high densities enabled by a high-coercivity medium of disk surface 317, such as, e.g., superparamagnetic iron-platinum nanoparticles, by heating disk surface 317 with a laser emitted by laser diode 320 via waveguide 322 and NFT 316 during write operations. Such heating of disk surface 317 decreases the coercivity of the magnetic medium of disk surface 317, thereby enabling the magnetic field generated by the write coil of write element 302 to magnetize the temporarily heated area of disk surface 317. The disk surface encoding the data thus written then cools back down and thereby returns to heightened magnetic coercivity, which durably preserves the written data at higher density than is possible in conventional techniques such as perpendicular magnetic recording (PMR).

Any suitable technique may be employed to heat the surface of the disk in HAMR recording, such as with a laser-generating component such as laser diode 320 and NFT 316 disposed proximate to write element 302 of head 318. Since the quality of the write/read signal depends on the fly height of head 318, and various factors may interact in complex ways to induce changes to the fly height, head 318 may also comprise one or more fly height actuators (FHA) for modifying or controlling the fly height. Any type of fly height actuator may be employed, such as TFCs 312, 314 as in the example of FIG. 3, which control or influence fly height of head 318 above disk surface 317 through thermal expansion, or a piezoelectric (PZT) actuator (not included in the example of FIG. 3) that actuates through mechanical deflection, or other FHA embodiments, in other examples.

A certain increment of laser current may typically have a regular, predictable, linear, or approximately linear in a small operating range, correspondence with a certain increment of power, a certain incremental change in NPTP displacement, and a certain incremental change in fly height spacing (within a practically applicable range), in various examples. For instance, in various illustrative examples of this disclosure, the laser threshold current, the nominal write laser current for performing write operations, and various laser pre-bias current levels may be measured in tens of milliamps, or single-digit milliamps. Applicable fly height spacing may be measured in different values in single-digit or fractional nanometers (i.e. hundreds of picometers), in various examples. Applicable TFC power may be measured in different values in single-digit milliwatts, in various examples. Applicable levels of laser current, fly height, and TFC power may also be in ranges greater or less than these values in other examples.

Laser pre-bias management circuitry 30 of control circuitry 22 may control the operation of head 318 to optimize laser pre-bias to reduce deleterious effects when switching to begin write operations, such as laser mode hops, transients, and changes in fly height 315 due to effects such as NPTP, to enable greater data storage performance, in accordance with aspects of this disclosure. The effective fly height 315 may be considered as the head-disk spacing between the pole tip of write element 302 and the corresponding disk surface 317, regardless of the center of mass of head 318, since the head-disk spacing determines the strength of a write operation using write element 302 of head 318 to the proximate area of disk surface 317.

Some conventional HAMR drives operate with a low level of pre-bias current applied to a laser, prior to a write operation. In these examples, the drives limit the laser pre-bias to a safety margin well below a level that would begin to induce any significant or non-trivial heating of the proximate disk surface and erosion of any pre-existing data in user data sectors that head 318 flies proximate to at its cruising fly height or non-write fly height, while pre-biasing the laser diode. ("User data sectors" between servo wedges in a track may also be referred to simply as "data sectors" or "sectors" herein.) As an example, conventional laser pre-bias over the data sector is typically at a low enough level that a head with a pre-biasing laser diode could pass proximate to the sector 1,000 times without inducing enough thermal erosion on the data sector to substantially impact the readability of its data, let alone to erase its data, in typical examples. Thus, in such conventional examples, the laser pre-bias current is not sufficient to induce data erosion on the preceding sector, at least not to any meaningful or significant degree, but rather is negligible at most and can be disregarded. Such traditional safety margin limits are higher than a laser threshold at which the diode begins to emit a laser, thereby inducing a plasmon onto the disk surface would heat disk surface 317, but not raising the recording media temperature of disk surface 317 to a point that would erode the data.

In contrast, pre-bias optimizing circuitry 30 is enabled to apply higher levels of laser pre-bias than the traditional safety margin in laser pre-bias current, while still avoiding erasing or eroding the data. Laser pre-bias optimizing circuitry 30 implements novel and inventive techniques such as optimizing laser pre-bias to achieve nominal write strength from the start of a write operation, and implementing higher laser pre-bias than in conventional HAMR, while systematically avoiding thermal decay of disk surface media and pre-existing data induced by such enhanced laser pre-bias. Pre-bias optimizing circuitry 30 instead applies a laser pre-bias current high enough to provide a stronger and steadier initial write strength starting from the beginning of a write operation, while still remaining low enough to avoid erasing or eroding the data, in the context of and based on its mapping of the individual thermal and magnetic responsiveness of each portion of disk surface 317. As a particular example, laser pre-bias management circuitry 30 may perform a method as depicted in FIG. 4

Figure 4:
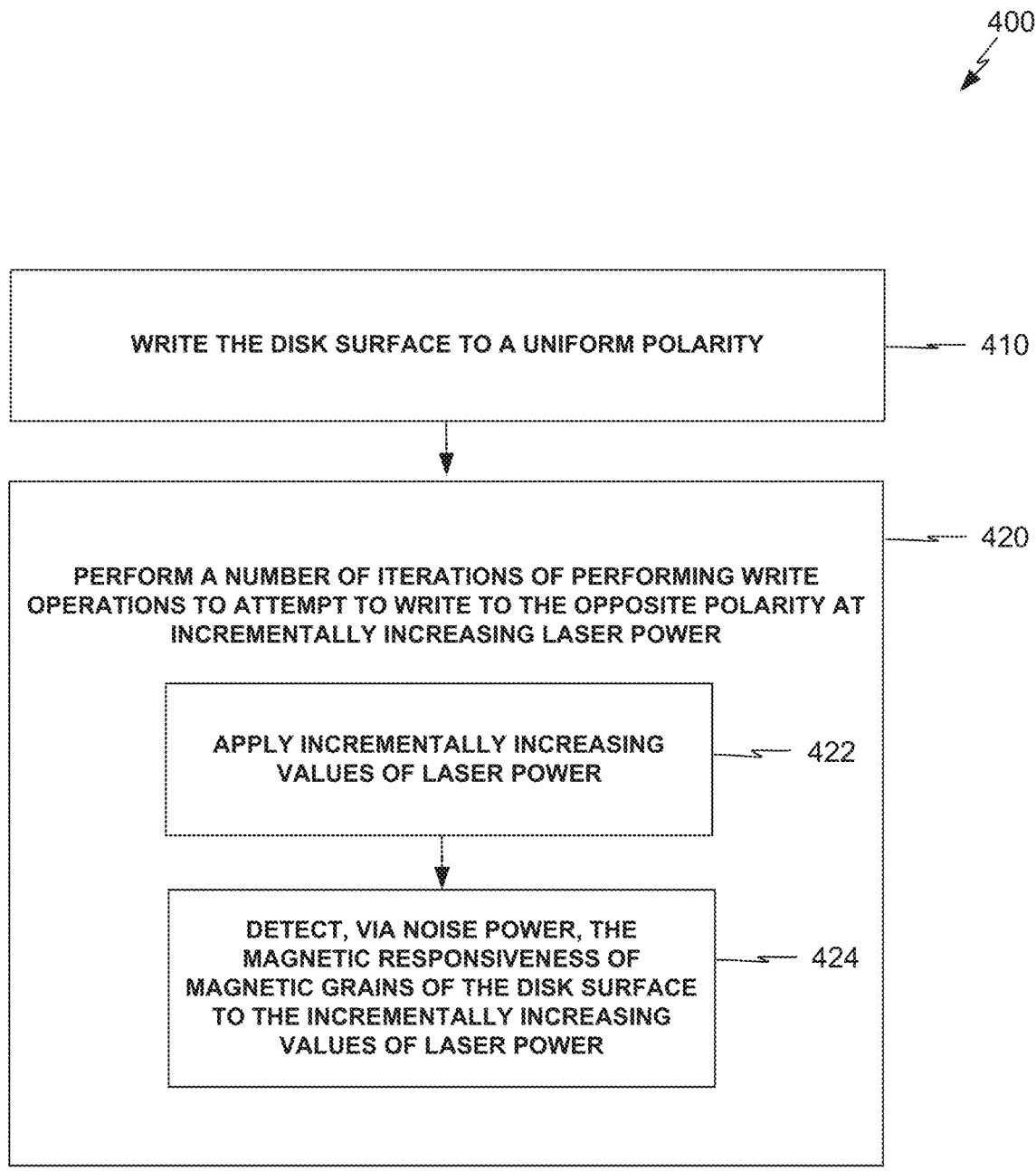
FIG. 4 depicts a flowchart for a method that pre-bias optimizing circuitry may perform for generating a map of thermal and magnetic properties and responsiveness of an individual disk surface to the operations of an individual head, in accordance with aspects of the present disclosure.

FIG. 4 depicts a flowchart for a method 400 that pre-bias optimizing circuitry 30 may perform for generating a map of thermal and magnetic properties and responsiveness of individual disk surface 317 to the operations of individual head 318, in accordance with aspects of the present disclosure. Pre-bias optimizing circuitry 30 may initialize the media of disk surface 317 in a saturated state by band DC writing or erasing disk surface 317 at maximum write current and at a large value of laser power, with a uniform polarity DC pattern (either negative or positive) (410). Pre-bias optimizing circuitry 30 may then perform a number of iterations of performing write operations to attempt to write to the opposite polarity (420), i.e., to reverse the magnetization of the magnetic grains or domains of disk surface 317, or perform a band DC erase or "knockdown," with an initially low and incrementally increasing laser power, while keeping the write power constant. This iterative process of applying incrementally increasing values of laser power and detecting the responsiveness of the magnetic grains thereto may be referred to as performing a laser sweep. For example, pre-bias optimizing circuitry 30 may perform laser sweep mapping operations with the write current at maximum, corresponding to performing write operations, and/or at a minimum or off setting, corresponding to pre-bias conditions before write operations.

In each iteration at each value of laser power in the laser sweep, pre-bias optimizing circuitry 30 may apply the selected laser power for that sweep (422), and detect, via noise power in the read-back signal, a proportion of magnetic grains reversed in polarity by the present values of laser power and write power (424). That is, pre-bias optimizing circuitry 30 may detect noise power at each position along each track of disk surface 317 during the laser sweep, and use the noise power as an accurate proxy for the proportion of magnetic grains at each position along each track reversed in polarity by the presently applied values of laser power and write power. The noise power is based on the variance of the readback signal. The proportion of magnetic grains that are reversed at each combination of laser power and write power are indicative of the likelihood of being overwritten or eroded at any given potential level of laser pre-bias current. Pre-bias optimizing circuitry 30 may perform an iteration of performing write operations to attempt to write to the opposite polarity (420), including applying the selected laser power for that sweep (422), and detecting, via noise power, the proportion of magnetic grains reversed in polarity by the present values of laser power and write power (424), at each increment of laser power being tested in the laser sweep.

Among the inventive insights of this disclosure, the susceptibility of the magnetic grains to being reversed by each combination of laser power and write power may vary from one position to another across each disk surface 317, due to heterogeneous properties of both disk surface 317 and the effects of the write and heating operations of head 318 at different track radii and different positions. Among the inventive insights of this disclosure, pre-bias optimizing circuitry 30 may map and take advantage of this variation in susceptibility of the magnetic grains to being reversed by different levels of laser power and write power of or at any one or more positions across each disk surface 317, to optimize the pre-bias current applied to laser diode 320 from one portion of disk surface 317 to another.

Pre-bias optimizing circuitry 30 may also detect the peak temperature of the portion of disk surface 317 heated by the laser, such as by converting each value of laser power to a corresponding peak temperature for that laser power. Pre-bias optimizing circuitry 30 may then detect and compare the noise power at each corresponding value of peak temperature. Pre-bias optimizing circuitry 30 may then generate a map of disk surface 317 of write probability with respect to local peak temperature of the disk surface portion heated by the laser, and at the given write power, where the peak temperature is an accurate proxy for thermal energy applied by the laser of head 318, as measured for every position of disk surface 317, in various examples.

Figure 5:
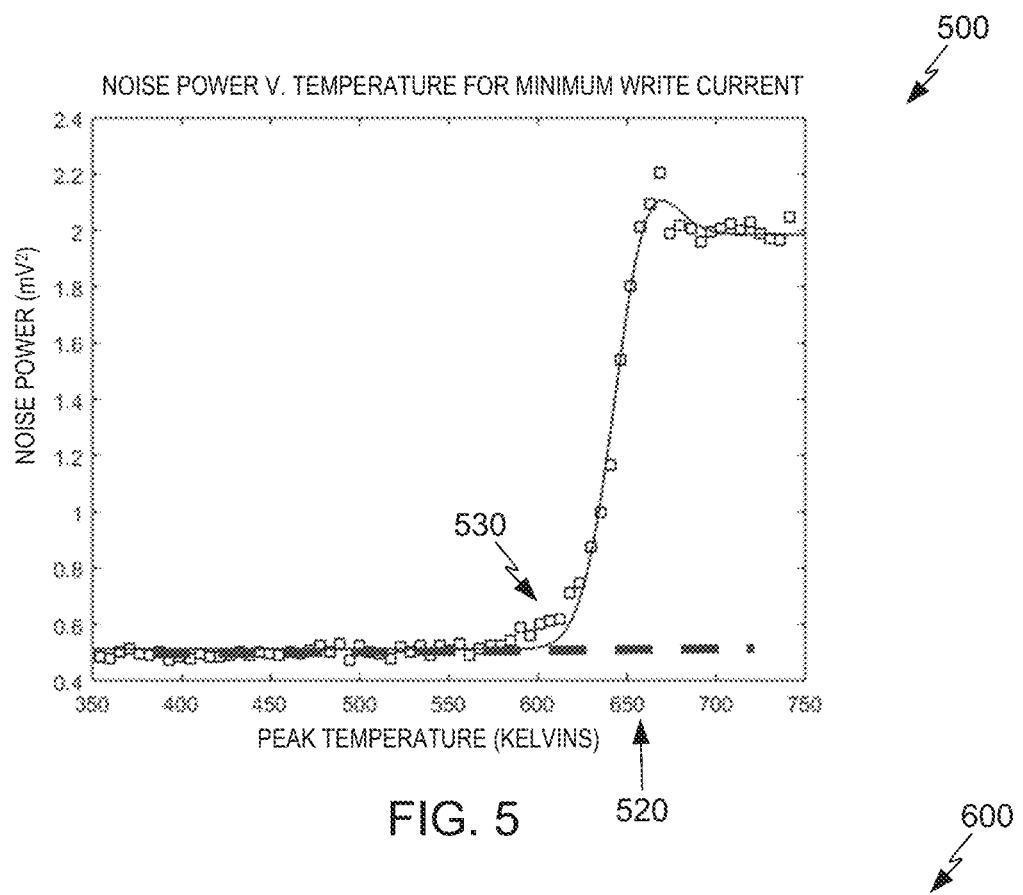
FIG. 5 shows a graph of detected noise power with respect to peak temperature, at a minimum or off write current, for one example position on a disk surface, in accordance with aspects of the present disclosure.
Figure 6:
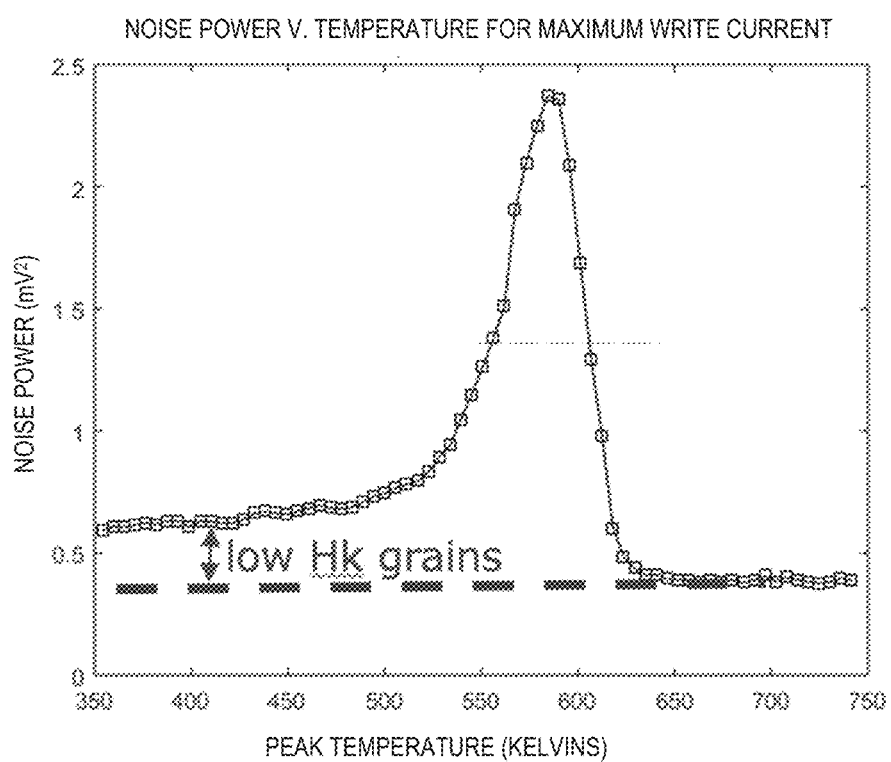
FIG. 6 shows a graph of detected noise power with respect to peak temperature, at maximum write current, for an example position on a disk surface, for comparison, in accordance with aspects of the present disclosure.

FIG. 5 shows a graph 500 of detected noise power with respect to peak temperature (along the y-axis and x-axis, respectively), at a minimum or off write current, for one example position on disk surface 317, in accordance with aspects of the present disclosure. The minimum write power may be non-zero and a very small percentage of the nominal write current in some examples (e.g., two or three percent of nominal or of maximum write current). Pre-bias optimizing circuitry 30 may thus generate a map of magnetic responsiveness to thermal energy of disk surface 317 in a form equivalent to a large number of versions of graph 500, with a version of graph 500 corresponding to each of a plurality of positions on disk surface 317, and with the individual magnetic responsiveness to thermal energy of each portion of disk surface 317 graphed in the mapping data for each portion of disk surface 317. FIG. 6 shows a graph 600 of detected noise power with respect to peak temperature, at maximum write current, for the example position on disk surface 317, for comparison, in accordance with aspects of the present disclosure.

In a laser sweep, pre-bias optimizing circuitry 30 begins with applying a low level of laser power corresponding to a low peak temperature as shown on the left part of the x-axis of graph 500, and incrementally increases laser power and peak temperature, progressing steadily toward the right along the x-axis in graph 500. The magnetic grains are initialized to one DC polarity, and with little or no write current, the magnetic grains are subject to thermal agitation by the laser, but initially very far below the Curie temperature, so the noise along the left portion of graph 500 remains close to zero. Only as the thermal energy from the pre-bias mode laser begins significantly approaching the Curie temperature 520, does the thermal energy begin to reverse polarity of a significant number of magnetic grains, which yields an approximately logistic growth curve in the readback noise power with respect to laser current and peak temperature. The maximum noise power is indicative of 50% of the magnetic grains being reversed in polarity. In temperatures above that, magnetic grain polarity remains effectively randomized, any data previously encoded in the magnetic grains is erased, there is very little net magnetic field to read, and the noise settles into a high steady state. While FIG. 5 depicts a given large range of peak temperatures, pre-bias optimizing circuitry 30 may perform a laser sweep with any of a wide range of temperatures and laser powers, with initial low levels and final high levels that may each be lower or higher than those depicted in FIG. 5, that are sufficient to characterize magnetic responsiveness to thermal energy of optimized pre-bias as described herein.

Pre-bias optimizing circuitry 30 may select a laser current value proximate to or just prior to the inflection point 530 before noise goes from close to zero to exponential or logistic increase, in various examples. In doing so, pre-bias optimizing circuitry 30 may seek to get as close as possible in pre-bias to the laser current, temperature, and operating conditions of write operations, while avoiding reversing a statistically significant proportion of magnetic grains and eroding or erasing the data encoded thereby.

Pre-bias optimizing circuitry 30 may use the data represented in graph 500 of detected noise power with respect to peak temperature to determine the standard deviation or sigma in laser-driven peak temperature relative to the local Curie temperature of the portion of disk surface 317. The Curie temperature is close to but less than the maximum of the noise power. In some illustrative examples, the sigma of peak temperature relative to Curie temperature at the position on disk surface 317 characterized in graph 500 may be 2.2%, 2.9%, or a similar value. The sigma may take any of a variety of values greater or lesser than these examples, in other implementations. Pre-bias optimizing circuitry 30 may derive the sigma by fitting the evolution of noise power with respect to the peak temperature with an analytical formula for fitting the noise power as a function of the laser current at the minimum magnetic write current, in various examples. The slope of the approximately logistic or Verhulst growth portion of noise power in graph 500 may be inversely proportional to sigma, or proportional to 1/sigma, such that the smaller the sigma, the steeper the slope, in various examples. Pre-bias optimizing circuitry 30 may use the sigma of peak temperature relative to Curie temperature as a parameter in selecting and applying an optimized pre-bias current based on the sigma of peak temperature relative to Curie temperature. For example, pre-bias optimizing circuitry 30 may select a pre-bias current for a given position that is a certain number of standard deviations or constant times the sigma below the pre-bias current that corresponds to the Curie temperature, as also shown in the following equation:

$$\text{Laser } Pre\text{-bias Current} = Tc - X * \text{sigma}(Tc) \quad \text{(Equation 1)}$$

where Tc is the Curie temperature (with a conversion factor between temperature and laser current), sigma(Tc) is the standard deviation of peak temperature relative to Curie temperature, and X is a conversion constant. For example, pre-bias optimizing circuitry 30 may select, tune, or optimize a pre-bias current for a given position that is three times sigma below the pre-bias current that corresponds to the Curie temperature for the given position, or set X equal to 3, which translates to close to 99.9% of the magnetic grains being statistically predicted to retain their polarity under proximity of head 318 at that pre-bias current.

Pre-bias optimizing circuitry 30 may also set, tune, or optimize pre-bias current per disk surface position based on a number of other goal criteria, in various examples. Pre-bias optimizing circuitry 30 may optimize pre-bias current as a percentage of the laser current at the Curie temperature per disk surface position, in various examples. Pre-bias optimizing circuitry 30 may optimize pre-bias current as a percentage of the default or nominal write bias current per disk surface position, in various examples. Pre-bias optimizing circuitry 30 may optimize pre-bias current to achieve a fixed target temperature of the heated media portion of disk surface 317 per disk surface position, in various examples. Pre-bias optimizing circuitry 30 may optimize pre-bias current to achieve a fixed temperature adjustment per disk surface position, in various examples.

Pre-bias optimizing circuitry 30 may optimize pre-bias current to achieve a target lifetime number of write operations per disk surface position, in various examples. With an increasing number of writes at each step of the laser sweep, the laser power at peak noise power shifts logarithmically. The slope of temperature at peak noise power to the logarithm of the number of writes has been found to be relatively consistent across heads, disk surfaces, and disk drives of the same head and media design. Pre-bias optimizing circuitry 30 may use this characterized slope to tune the optimized pre-bias for a target number of write operations in the total lifetime of disk drive 15, in various examples.

While most laser mode hops induce a sudden decrease in laser power, some may also induce a sudden increase in laser power. Pre-bias optimizing circuitry 30 may optimize pre-bias current to provide for an additional margin to pre-compensate for laser mode hops that may suddenly increase the laser power per disk surface position, in various examples. The occurrence of laser mode hops has been found to often be highly correlated with disk surface position, so such compensation for laser mode hops may also become a highly variable component in optimized pre-bias current per disk surface position.

Pre-bias optimizing circuitry 30 may optimize pre-bias current to provide for an additional margin to pre-compensate for otherwise uncompensated or unpredictable variations in fly height head-disk spacing ("fly height") per disk surface position, in various examples. The magnetic responsiveness to laser pre-bias thermal energy of disk surface 317 as graphed in FIG. 5 may also vary in dependence on operating temperature of disk drive 15, and show different responsiveness when the disk surface 317 is at ambient temperature or hot in its general operations prior to heating by the pre-biased laser. Pre-bias optimizing circuitry 30 may also optimize pre-bias current to compensate for variations due to general operating temperature. Pre-bias optimizing circuitry 30 may also optimize pre-bias current based on any combination of such criteria described above and/or others as described herein.

Figure 7:
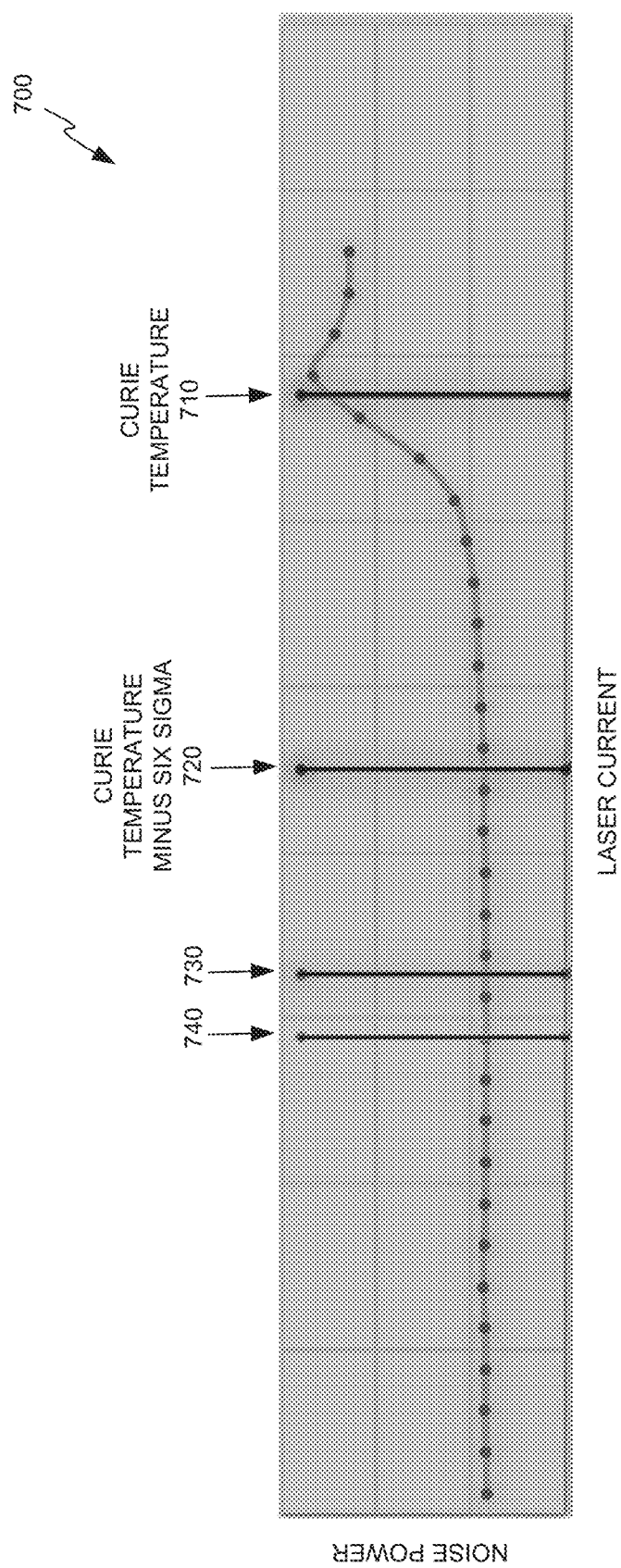
FIG. 7 shows a graph of noise power with respect to laser current for a pre-bias laser sweep, with various candidate optimized laser pre-bias current values that pre-bias optimizing circuitry may determine, generate, and select from, in accordance with aspects of the present disclosure.

FIG. 7 shows a graph 700 of noise power with respect to laser current for a pre-bias laser sweep, with various candidate optimized laser pre-bias current values that pre-bias optimizing circuitry 30 may determine, generate, and select from, in accordance with aspects of the present disclosure. FIG. 7 is thus analogous to FIG. 5 but shows laser current rather than corresponding peak media temperature along the x-axis. A laser current value corresponding to the Curie temperature is shown at 710. Pre-bias optimizing circuitry 30 may determine the local sigma standard deviation around the Curie temperature and may determine one candidate optimized laser pre-bias current at six times sigma below the Curie temperature, shown at 720. Pre-bias optimizing circuitry 30 may further determine another candidate optimized laser pre-bias current 730 that is further tuned with an additional margin from candidate pre-bias current 720 to pre-compensate for lifetime logarithmic shift of laser power per peak noise power, for a target of 100,000 lifetime write operations. Pre-bias optimizing circuitry 30 may further determine another candidate optimized laser pre-bias current 740 that is further tuned with an additional margin from candidate pre-bias current 730 to pre-compensate for the maximum predicted sudden increase in laser power due to laser mode hop per disk surface position, at the disk surface position corresponding to the candidate optimized pre-bias current values of FIG. 7.

Pre-bias optimizing circuitry 30 may also apply separate laser pre-bias optimizations when the head is proximate to data portions of disk surface 317 and when the head is proximate to servo pattern portions of disk surface 317, such as to ensure extra protection of the servo pattern portions. Pre-bias optimizing circuitry 30 may apply separate laser pre-bias optimizations in the context of seeking to ensure protection of the servo patterns for the lifetime of disk drive 15, while pre-bias optimizing circuitry 30 may also aim to protect data portions with lesser protection than for servo patterns, in the view that data may often be overwritten and any single set of data may not need to be treated with assured protection for the entire predicted lifetime of disk drive 15, for the sake of optimizing at a higher pre-bias and achieving the advantages thereof, in some examples.

Pre-bias optimizing circuitry 30 may determine candidate optimized laser pre-bias current that is tuned with margins to account for a variety of the effects described above. Thus, in various examples, pre-bias optimizing circuitry 30 may determine candidate optimized laser pre-bias currents based on a constant times the determined sigma below the Curie temperature and that is then tuned with various margins, such as in the following example equation:

$$Pre\text{-bias Laser Current}=(Tc-X^*\text{SigmaTc})-\text{Thermal Slope}^*\log(\text{Target }Num\text{ Writes})-\text{Mode }Hop\text{ Margin}-Fly\text{ Height Spacing Margin} \quad \text{(Equation 2)}$$

That is, pre-bias optimizing circuitry 30 may determine a candidate optimized pre-bias current that corresponds to applying a temperature that is a constant times sigma below the Curie temperature, and then further reduced by margins to compensate for the determined thermal slope times the logarithm of the lifetime target number of write operations, laser mode hops, and unpredictable changes in fly height, in various examples. Pre-bias optimizing circuitry 30 may also determine candidate optimized pre-bias current levels and select a candidate to apply pre-bias current per disk position based on taking into account any of the criteria, margins, and factors as described above, in various examples.

Figure 8:
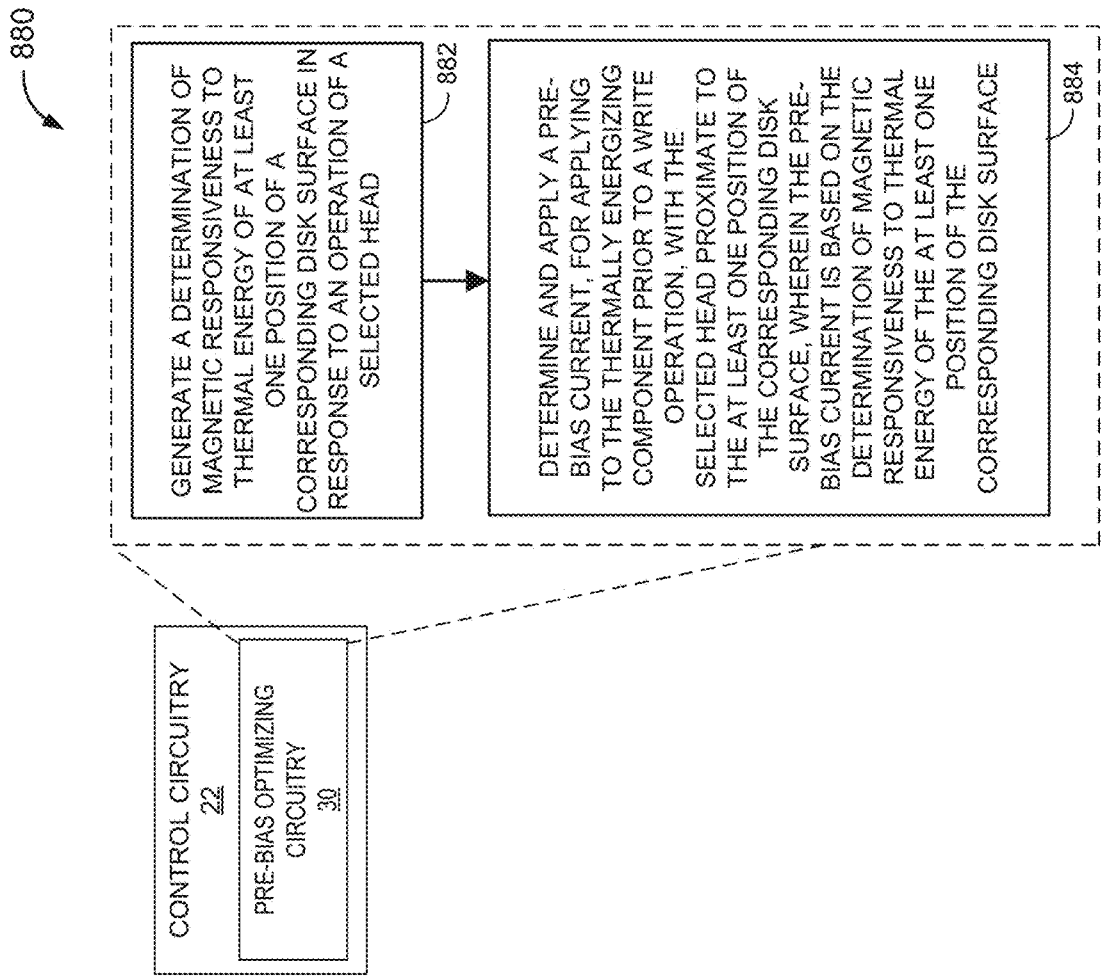
FIG. 8 depicts another example method that pre-bias optimizing circuitry may be configured to perform, in accordance with aspects of the present disclosure.

FIG. 8 depicts another example method 880 that pre-bias optimizing circuitry 30 of control circuitry may be configured to perform, in accordance with aspects of the present disclosure. Pre-bias optimizing circuitry 30 may be configured to generate a determination of magnetic responsiveness to thermal energy of at least one position of the corresponding disk surface in response to an operation of the selected head (882). Pre-bias optimizing circuitry 30 may be further configured to determine and apply a pre-bias current to the thermally energizing component prior to a write operation, with the selected head proximate to the at least one position of the corresponding disk surface, wherein the pre-bias current is based on the determination of magnetic responsiveness to thermal energy of the at least one position of the corresponding disk surface (884). In various examples, generating a map of thermal responsiveness of the magnetic grains of the disk surface may comprise generating a determination of thermal responsiveness of the magnetic grains for any number of positions of the disk surface, and for one or more individual positions of the disk surface.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
one or more disks;
an actuator mechanism configured to position a selected head among one or more heads proximate to a corresponding disk surface among the one or more disks, wherein the selected head comprises a thermally energizing component; and
one or more processing devices configured to:
generate a determination of magnetic responsiveness to thermal energy of at least one position of the corresponding disk surface in response to an operation of the selected head; and
determine and apply a pre-bias current to the thermally energizing component of each selected head prior to activating the thermally energizing component at a nominal current for a write operation, with the selected head proximate to the at least one position of the corresponding disk surface, wherein the pre-bias current is based on the determination of magnetic responsiveness to thermal energy of the at least one position of the corresponding disk surface, wherein the applied pre-bias current provides an initial write strength starting from a beginning of the write operation, while still remaining low enough to avoid erasing or eroding data on the one or more disks.

2. The data storage device of claim 1, wherein the one or more processing devices are further configured to:
generate a map of determinations of magnetic responsiveness to thermal energy of a plurality of positions of the corresponding disk surface in response to operations of the selected head; and
determine and apply the pre-bias current to the thermally energizing component prior to a write operation, proximate to the plurality of positions of the corresponding disk surface, wherein the thermal pre-bias current at each of the positions is based on the map of determinations of magnetic responsiveness to thermal energy of the plurality of positions of the corresponding disk surface.

3. The data storage device of claim 2, wherein the one or more processing devices are further configured to:
write the corresponding disk surface to a uniform polarity; and
perform a number of iterations of performing write operations to attempt to write to the opposite polarity, wherein performing the write operations comprises:
applying incrementally increasing values of laser power; and
detecting, via noise power, a magnetic responsiveness of magnetic grains of the plurality of positions of the corresponding disk surface to the incrementally increasing values of laser power.

4. The data storage device of claim 2, wherein the one or more processing devices are further configured to:
determine a standard deviation of peak temperature relative to Curie temperature of the corresponding disk surface, and
wherein determining the thermal pre-bias current comprises determining the thermal pre-bias current based on a constant times the standard deviation of peak temperature relative to Curie temperature below a pre-bias current that corresponds to the Curie temperature per position of the corresponding disk surface.

5. A data storage device, comprising:
one or more disks;
an actuator mechanism configured to position a selected head among one or more heads proximate to a corresponding disk surface among the one or more disks, wherein the selected head comprises a thermally energizing component; and
one or more processing devices configured to:
generate a determination of magnetic responsiveness to thermal energy of at least one position of the corresponding disk surface in response to an operation of the selected head; and
determine and apply a pre-bias current to the thermally energizing component prior to a write operation, with the selected head proximate to the at least one position of the corresponding disk surface, wherein the pre-bias current is based on the determination of magnetic responsiveness to thermal energy of the at least one position of the corresponding disk surface,
wherein the one or more processing devices are further configured such that determining the thermal pre-bias current comprises determining the thermal pre-bias current based on a percentage of laser current at a Curie temperature of the position of the corresponding disk surface or a percentage of a nominal write bias current of the position of the corresponding disk surface.

6. A data storage device, comprising:
one or more disks;
an actuator mechanism configured to position a selected head among one or more heads proximate to a corresponding disk surface among the one or more disks, wherein the selected head comprises a thermally energizing component; and
one or more processing devices configured to:
generate a determination of magnetic responsiveness to thermal energy of at least one position of the corresponding disk surface in response to an operation of the selected head; and determine and apply a pre-bias current to the thermally energizing component prior to a write operation, with the selected head proximate to the at least one position of the corresponding disk surface, wherein the pre-bias current is based on the determination of magnetic responsiveness to thermal energy of the at least one position of the corresponding disk surface, wherein the one or more processing devices are further configured such that determining the thermal pre-bias current comprises determining the thermal pre-bias current based on achieving: a fixed target temperature of a heated media portion of the position of the corresponding disk surface; a fixed temperature adjustment of the position of the corresponding disk surface; or a target lifetime number of write operations of the position of the corresponding disk surface.

7. A data storage device, comprising:
one or more disks;
an actuator mechanism configured to position a selected head among one or more heads proximate to a corresponding disk surface among the one or more disks, wherein the selected head comprises a thermally energizing component; and
one or more processing devices configured to:
generate a determination of magnetic responsiveness to thermal energy of at least one position of the corresponding disk surface in response to an operation of the selected head; and
determine and apply a pre-bias current to the thermally energizing component prior to a write operation, with the selected head proximate to the at least one position of the corresponding disk surface, wherein the pre-bias current is based on the determination of magnetic responsiveness to thermal energy of the at least one position of the corresponding disk surface,
wherein the one or more processing devices are further configured such that determining the thermal pre-bias current comprises determining the thermal pre-bias current based on: providing for an additional margin to pre-compensate for laser mode hops proximate to the position of the corresponding disk surface; providing for an additional margin to pre-compensate for variations in fly height proximate to the position of the corresponding disk surface; or providing for a margin to compensate for variations in general operating temperature of the disk drive.

8. The data storage device of claim 1, further comprising A data storage device, comprising:
one or more disks;
an actuator mechanism configured to position a selected head among one or more heads proximate to a corresponding disk surface among the one or more disks, wherein the selected head comprises a thermally energizing component; and
one or more processing devices configured to:
generate a determination of magnetic responsiveness to thermal energy of at least one position of the corresponding disk surface in response to an operation of the selected head;
determine and apply a pre-bias current to the thermally energizing component prior to a write operation, with the selected head proximate to the at least one position of the corresponding disk surface, wherein the pre-bias current is based on the determination of magnetic responsiveness to thermal energy of the at least one position of the corresponding disk surface; and applying separate laser pre-bias optimizations when the selected head is proximate to data sectors of the corresponding disk surface and when the selected head is proximate to servo patterns on the corresponding disk surface.

9. The data storage device of claim 1, wherein the thermally energizing component comprises a laser diode configured to emit a laser.

10. A data storage device, comprising:
one or more disks;
an actuator mechanism configured to position a selected head among one or more heads proximate to a corresponding disk surface among the one or more disks, wherein the selected head comprises a thermally energizing component; and
one or more processing devices configured to:
generate a determination of magnetic responsiveness to thermal energy of at least one position of the corresponding disk surface in response to an operation of the selected head; and
determine and apply a pre-bias current to the thermally energizing component prior to a write operation, with the selected head proximate to the at least one position of the corresponding disk surface, wherein the pre-bias current is based on the determination of magnetic responsiveness to thermal energy of the at least one position of the corresponding disk surface;
wherein the one or more processing devices are further configured to:
keep track of on-track and adjacent track thermal erosion induced by the thermal pre-bias current; and
perform refresh writes to compensate for the on-track and adjacent track thermal erosion induced by the thermal pre-bias current.

11. A method comprising:
generating, by one or more processors, a map of magnetic responsiveness to thermal energy of a corresponding disk surface in response to operations of a selected head of a disk drive comprising one or more disks, and an actuator mechanism configured to position a selected head among one or more heads proximate to a corresponding disk surface among the one or more disks, wherein the selected head comprises a thermally energizing component; determining, by the one or more processors, a thermal pre-bias current, for applying to the thermally energizing component prior to write operations, with respect to position of the selected head relative to the corresponding disk surface, based on the map of magnetic responsiveness to thermal energy of the corresponding disk surface;
writing the corresponding disk surface to a uniform polarity; and
performing a number of iterations of performing write operations to attempt to write to the opposite polarity, wherein performing the write operations comprises:
applying incrementally increasing values of laser power; and
detecting, via noise power, a magnetic responsiveness of magnetic grains of the corresponding disk surface to the incrementally increasing values of laser power.

12. The method of claim 11, further comprising:
determining a standard deviation of peak temperature relative to Curie temperature of the corresponding disk surface, and
wherein determining the thermal pre-bias current comprises determining the thermal pre-bias current based on a constant times the standard deviation of peak temperature relative to Curie temperature below a pre-bias current that corresponds to the Curie temperature per position of the corresponding disk surface.

13. One or more processing devices comprising:
means for generating a determination of magnetic responsiveness to thermal energy of at least one position of a corresponding disk surface in response to an operation of a selected head of a disk drive, the disk drive comprising one or more disks and an actuator mechanism configured to position the selected head proximate to the corresponding disk surface among the one or more disks, wherein the selected head comprises a thermally energizing component; and
means for determining and applying a pre-bias current to the thermally energizing component of each selected head prior to activating the thermally energizing component at a nominal current for a write operation, with the selected head proximate to the at least one position of the corresponding disk surface, wherein the pre-bias current is based on the determination of magnetic responsiveness to thermal energy of the at least one position of the corresponding disk surface, wherein the applied pre-bias current provides an initial write strength starting from a beginning of the write operation, while still remaining low enough to avoid erasing or eroding data on the one or more disks.

14. The one or more processing devices of claim 13, further comprising:
means for writing the corresponding disk surface to a uniform polarity; and
means for performing a number of iterations of performing write operations to attempt to write to the opposite polarity, wherein the means for performing the write operations comprise:
means for applying incrementally increasing values of laser power; and
means for detecting, via noise power, a magnetic responsiveness of magnetic grains of the corresponding disk surface to the incrementally increasing values of laser power.

* * * * *